March 17, 1936.   A. J. MEYER   2,034,409
ENGINE
Filed July 11, 1931   2 Sheets-Sheet 1
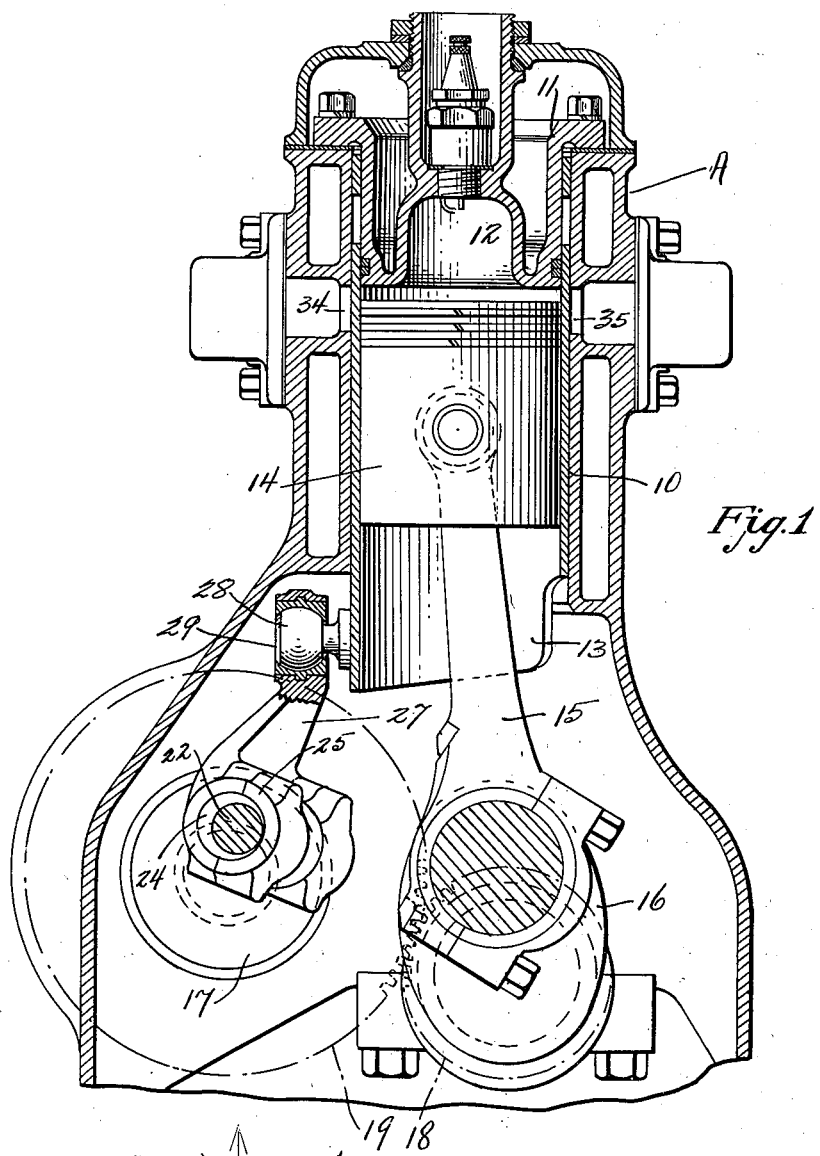
Fig.1
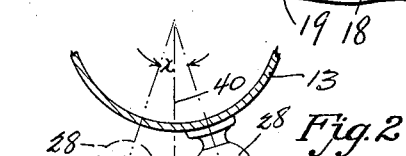
Fig.2
INVENTOR.
Andre J. Meyer
BY 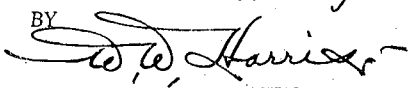
ATTORNEY.

March 17, 1936. A. J. MEYER 2,034,409
ENGINE
Filed July 11, 1931 2 Sheets-Sheet 2

INVENTOR.
Andre J. Meyer.
BY
ATTORNEY.

Patented Mar. 17, 1936

2,034,409

UNITED STATES PATENT OFFICE 2,034,409

ENGINE

Andre J. Meyer, Detroit, Mich., assignor to Continental Motors Corporation, Detroit, Mich., a corporation of Virginia Application July 11, 1931, Serial No. 550,065

26 Claims. (Cl. 123—81)

This invention relates to internal combustion engines and refers more particularly to the sleeve valve and generally similar types of engines as distinguished from poppet valve engines.

It is an object of my invention to provide improvements in engines of the aforesaid type whereby the engine may be readily reversed in its direction of power drive. I have illustrated my invention in connection with the Burt-McCollum type of engine in which a single sleeve valve for each cylinder is given a combined axial reciprocation and oscillation to obtain the well known valving functions of the engine, a point on the sleeve tracing a closed curve path during its movement.

There are many uses for an engine adapted to have its crankshaft or other power actuator capable of power movement in opposite directions, such for example in marine installations, dirigible and aircraft installations, etc.

A further object of my invention resides in the provision of a simple efficient reversing mechanism, especially adapted to engines of the aforesaid single sleeve valve type although not necessarily limited thereto.

It is a further object of my invention to provide a reversible sleeve valve engine wherein the cylinder and sleeve ports are so arranged that they are capable of porting for either direction of engine drive.

A further object of my invention resides in the provision of a sleeve valve engine having an axially shiftable valve shaft adapted to control rotation of the engine crankshaft in opposite directions.

Further objects and advantages of my invention will be apparent as this specification progresses reference being had to the accompanying drawings in which:

Figure 1 is a sectional elevation view of a typical cylinder of the engine.

Figure 2 is a diagrammatic detail view illustrating the sleeve valve in its two positions of opposite drive.

Figure 4:
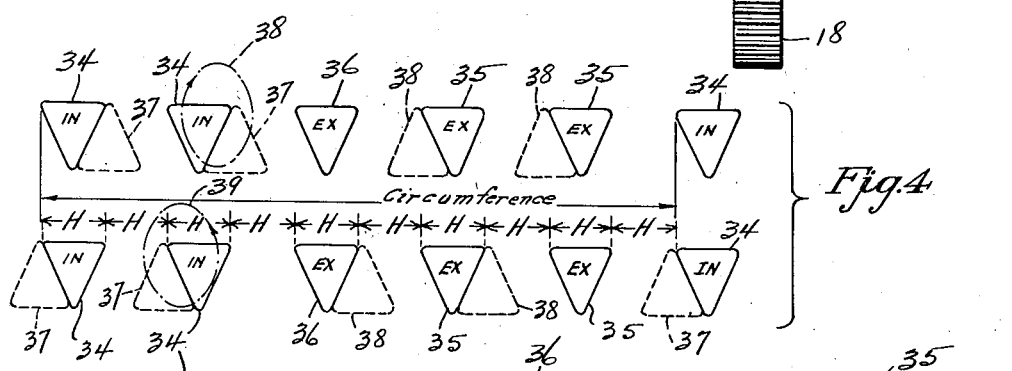
Figures 5, 6:
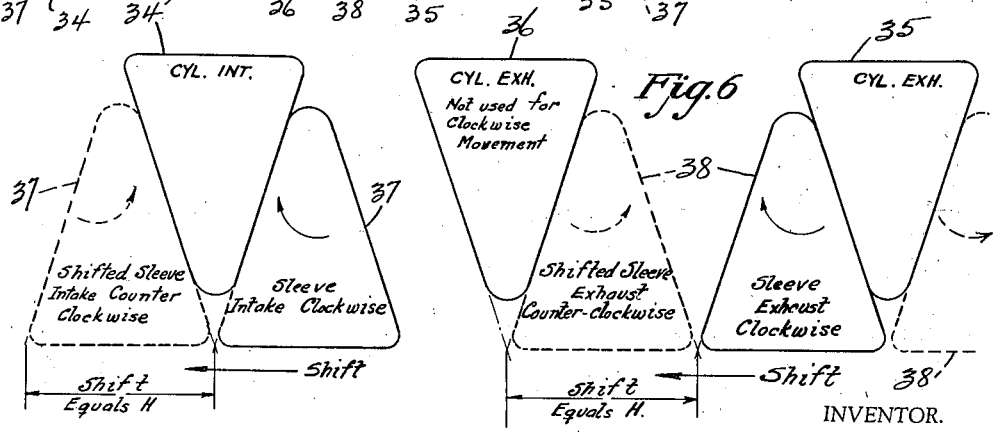

Figure 4 is a diagrammatic development view of a typical sleeve and cylinder port arrangement illustrating the sleeve port shifting, Figure 5 is an enlarged detail view diagrammatically illustrating the two positions of a typical sleeve intake port and its associated cylinder port, and Figure 6 is an enlarged detail view diagrammatically illustrating the two positions of a typical sleeve exhaust port with its associated cylinder port arrangement.

In the drawings reference character A represents the engine of the aforesaid Burt-McCollum type, a typical cylinder 10 thereof being illustrated in Figure 1. This cylinder has the usual cylinder head 11 depending therewithin to provide a combustion chamber 12, a single sleeve valve 13 operating within the cylinder and having its upper end working between the cylinder head and cylinder. The usual piston 14 is located within sleeve 13 and through connecting rod 15 operates the crankshaft 16. For a four stroke cycle engine as illustrated a layshaft or valveshaft 17 is driven at half engine or crankshaft speed by the reduction driving means illustrated by driving and driven gears 18, 19 respectively connected to the crankshaft and valveshaft.

The valveshaft 17 is mounted for rotation and axial shifting in spaced bearings 20, the valveshaft having bearing portions 21 engageable therein. The valveshaft has, associated with each sleeve and cylinder, a wobble crank 22 herein illustrated as comprising spaced balls 23, 24 receiving sockets 25, 26 of the sleeve link 27 which is connected at its opposite end to the lower end of sleeve 13 through the ball 28 carried by sleeve 13 and the socket 29 carried by the link 27.

Figure 3:
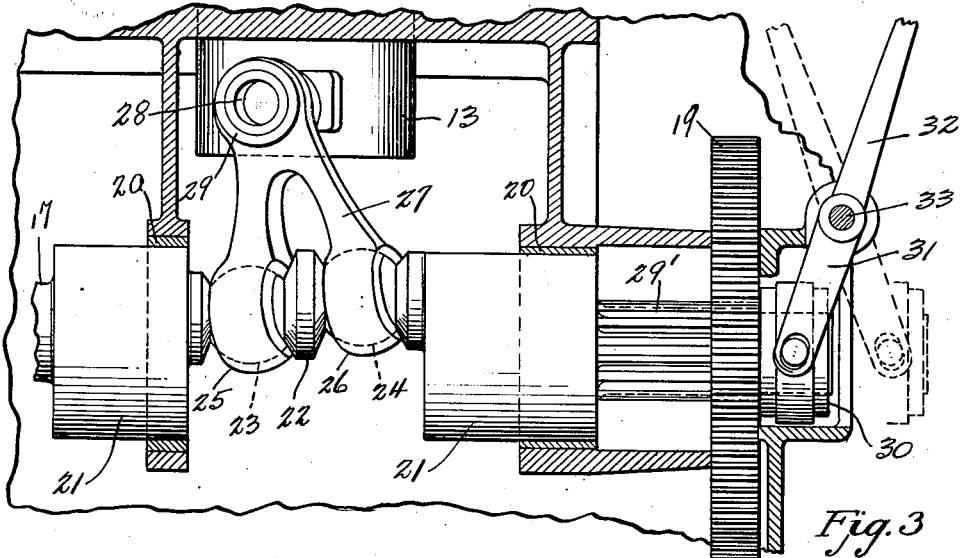
Figure 3 is a detail sectional view illustrating the valveshaft moving means for controlling the sleeves for opposite drive.

For purposes hereinafter more apparent, the front end of valveshaft 17 has a spline 29' slidable in gear 19 and a collar 30 movable by yoke 31 of lever 32 having a fixed pivot 33. By manually actuating lever 32 the valveshaft may be moved to the right from its position in Figure 3 as illustrated by the dotted valveshaft end, such movement controlling the reversing of the engine. During such movement wobble cranks 22 and links 27 will also be shifted serving to rotate each sleeve valve through an angle $x$ in Figure 2. Thus each sleeve will have its movement as before but from a position rotatably shifted, the valveshaft, crankshaft, and sleeve moving in opposite directions as will be more apparent from the following description of the porting arrangement.

The cylinder 10 is formed with intake ports 34 and exhaust ports 35, 36 such ports being preferably arranged substantially in a plane across the cylinder axis with the exhaust and intake ports grouped consecutively together. The sleeve valve has similarly grouped intake ports 37 and exhaust ports 38 and referring to Figure 4 the cylinder ports are shown in full lines and the sleeve ports in dotted lines "IN" designating intake ports and "EX" designating exhaust ports, the sleeve having a circumference as designated. The sleeve ports are illustrated as being symmetrical and triangular with their apices extending axially upwardly while the cylinder ports are illustrated as being similarly symmetrical and triangular with their apices extending axially downwardly, such form of ports being adapted to function for either direction of sleeve movement as indicated by the closed curve paths 38, 39 traced by a point on the sleeve.

Referring to Figure 4 and the upper row of cylinder and sleeve ports it will be noted that the sleeve movement 38 is clockwise, the intake ports just commencing the intake cycle and the exhaust ports just having completed the exhaust cycle. With the ports arranged in such position the engine crankshaft turns in a definite direction. Now let us assume that the direction of crankshaft rotation is to be reversed. The operator shifts lever 32 and thereby shifts the valveshaft a distance H (see Figures 4, 5 and 6), each sleeve being rotated through angle $x$. The sleeve ports 37, 38 now occupy a different position relative to the cylinder ports 34, 35, 36 as illustrated in the lower row of ports in Figure 4. In such position the ports will cause opposite rotation of the crankshaft. Thus assuming the shift to take place with the ports arranged as in the top row of Figure 4 to a position as in the bottom row of Figure 4, intake is just beginning and exhaust is just completed but the direction of movement of the sleeve, crankshaft, and valveshaft is opposite.

It will be noted that the porting is accomplished with two cylinder intake ports 34 and two cylinder exhaust ports 35, with cooperating sleeve intake ports 37 and sleeve exhaust ports 38, there being an extra cylinder exhaust port 36 having no function for the direction of rotation as in the upper row of ports in Figure 4 but adapted to function when the sleeve is shifted as in the lower row. In the latter instance one of the exhaust ports 35 (being the last one to the right in Figure 4) does not function due to the shift.

In Figure 5 I have illustrated a typical cylinder intake port 34 and its associated sleeve intake port 37, the latter being shown in its two positions of shift ready for intake opening in each position.

In Figure 6 to the right thereof, I have illustrated a typical cylinder exhaust port 35 and associated sleeve exhaust port 38, the latter being shown in its two positions of shift. In Figure 6 to the left thereof, I have also illustrated the extra exhaust port 36 which is not used for clockwise sleeve rotation but which is used for counterclockwise sleeve rotation after the valveshaft has been shifted for reversing the engine.

By providing symmetrical ports the amount of shift H is the horizontal travel or distance between adjacent sleeve ports and also the port width as will be noted from Figure 4. With such arrangement the amount of shift for reversing movement equals the circumference of the sleeve valve divided by twice the number of cylinder ports, there being preferably one more cylinder exhaust ports than intake ports.

Referring to Figure 2 it will be noted that the ball 28 carried by the sleeve is positioned in its two positions of valveshaft shift preferably equally to either side of the radius 40 which is perpendicular to the valveshaft axis whereby in either of its positions of shifting the ball 28 is operated only half the angle $x$ away from its normally best location which is at radius 40.

While I have described and claimed the ports of the sleeve valve and cylinder as substantially triangular in shape I desire it understood that such term is broadly used as these ports may vary within the scope of my invention from a geometrical triangle as long as the general port construction is triangularly elongated. Such construction is evolved by reason of the desired general symmetry of the cylinder ports with their slanting side edges for selective cooperation with cooperating slanting side edges of the sleeve ports resulting in the generally triangularly shaped ports. In actual practice to realize most efficient port areas the apices of the ports may be somewhat elongated beyond a strictly triangular shape and one slanting edge of each intake port may slope to a greater extent than the other to obtain more favorable engine performance in one direction (ordinarily forward speed for the vehicle equipped with such engine) than in the other direction (ordinarily reverse speed for the vehicle). Such details constitute refinements and modifications of my invention for which I have filed a separate application Ser. No. 566,172 filed August 10, 1931. The claims in this subject application appended hereto are intended to broadly cover such modifications.

Instead of shifting the sleeve ports as described relative to the cylinder ports it will be obvious that the cylinder ports may be shifted if desired relative to the sleeve ports.

What I claim as my invention is:

1. In an internal combustion engine the combination of a cylinder having a piston and crankshaft, a sleeve valve for said cylinder, means including a single layshaft for operating said sleeve valve means, and means for shifting said operating means to cause the engine to reverse its operation.

2. In an internal combustion engine the combination of a cylinder having a piston and crankshaft, sleeve valve means for said cylinder, means operating said sleeve valve means, and means for shifting said sleeve valve means to cause the engine to reverse its operation.

3. In an internal combustion engine the combination of a cylinder having a piston and crankshaft, sleeve valve means for said cylinder, means operating said sleeve valve means, and means for shifting said operating means and said sleeve means for causing the engine to reverse its operation.

4. In an internal combustion engine the combination of a cylinder having a piston and crankshaft, sleeve valve means for said cylinder, means operating said sleeve valve means, and means for shifting said sleeve valve means rotatively relative to its axis to cause the engine to reverse its operation.

5. In an internal combustion engine of the sleeve valve type, a cylinder, a piston, a sleeve valve, said cylinder and sleeve valve having cooperating intake and exhaust ports, means including a valveshaft for imparting combined axial reciprocation and oscillation to the sleeve valve selectively in opposite directions of movement, and means for driving said valveshaft in the same direction during either of said sleeve valve movements.

6. In an internal combustion engine of the sleeve valve type, a cylinder, a piston, a sleeve valve, said cylinder and sleeve valve having cooperating intake and exhaust ports, a wobble crank layshaft for driving the sleeve valve, and means for axially shifting said layshaft to cause reversal of the engine.

7. In an engine of the type having a cylinder and associated sleeve valve adapted to move with combined axial reciprocation and oscillation, said cylinder and sleeve having cooperating intake and exhaust ports, a piston, a crankshaft connected with the piston, means for imparting said movement to the sleeve valve, and means for shifting said sleeve valve to modify its valving functions with said cylinder ports, said cylinder having one more exhaust port than the number of exhaust ports in said sleeve valve, said exhaust port being without function in one position of said sleeve valve but adapted to function when said sleeve valve is shifted.

8. In an engine of the type having a cylinder and associated sleeve valve adapted to move with combined axial reciprocation and oscillation, said cylinder and sleeve having cooperating intake and exhaust ports, a piston, a crankshaft connected with the piston, means for imparting said movement to the sleeve valve, said cylinder and sleeve ports being substantially triangular with their apices extending axially of the sleeve, and means for relatively shifting the cylinder and sleeve ports whereby the sides of said substantially triangular sleeve ports selectively cooperate with different sides of said substantially triangular cylinder ports.

9. In an engine of the type having a cylinder and associated sleeve valve adapted to move with combined axial reciprocation and oscillation, said cylinder and sleeve having cooperating intake and exhaust ports, a piston, a crankshaft connected with the piston, means for imparting said movement to the sleeve valve selectively in opposite directions, said cylinder ports being spaced an amount substantially equal to the width of the cylinder ports, said sleeve ports approaching said cylinder ports selectively from opposite directions.

10. In an engine of the type having a cylinder and associated sleeve valve adapted to move with combined axial reciprocation and oscillation, said cylinder and sleeve having cooperating intake and exhaust ports, a piston, a crankshaft connected with the piston, means for imparting said movement to the sleeve valve, said cylinder ports being substantially equally spaced an amount substantially equal to the width of the cylinder ports, and means for rotatively shifting the sleeve valve to cause the ports thereof to selectively approach the cylinder ports from opposite directions.

11. In an engine of the type having a cylinder and associated sleeve valve adapted to move with combined axial reciprocation and oscillation, said cylinder and sleeve having cooperating intake and exhaust ports, a piston, a crankshaft connected with the piston, means for imparting said movement to the sleeve valve, said means including a valveshaft having a wobble crank and link intermediate the wobble crank and sleeve valve, and means for shifting the wobble crank to position the connection between the link and sleeve valve substantially equal distances to either side of a plane containing the sleeve valve radius perpendicular to the valveshaft axis.

12. In an engine of the type having a cylinder and associated sleeve valve adapted to move with combined axial reciprocation and oscillation, said cylinder and sleeve having cooperating intake and exhaust ports, a piston, a crankshaft connected with the piston, means for imparting said movement to the sleeve valve, said means including a wobble crank, and means for shifting the position of said wobble crank.

13. In an engine of the type having a cylinder and associated sleeve valve adapted to move with combined axial reciprocation and oscillation, said cylinder and sleeve having cooperating intake and exhaust ports, a piston, a crankshaft connected with the piston, means for imparting said movement to the sleeve valve selectively in opposite directions, said cylinder and sleeve ports being substantially triangular with their apices extending axially of the sleeve, the apices of the cylinder ports extending axially downwardly and the apices of the sleeve ports extending axially upwardly, the sides of said substantially triangular sleeve intake ports adjacent the apices thereof selectively cooperating with the sides respectively of said substantially triangular cylinder intake ports adjacent the apices thereof for controlling engine intake when said sleeve valve is moved selectively in opposite directions.

14. In an engine of the type having a cylinder and associated sleeve valve adapted to move with combined axial reciprocation and oscillation, said cylinder and sleeve having cooperating intake and exhaust ports, a piston, a crankshaft connected with the piston, means for imparting said movement to the sleeve valve, said cylinder intake port having a plurality of port opening edges adapted for selective port opening by said sleeve valve intake port, said sleeve valve intake port also having a plurality of port opening edges.

15. In an engine of the type having a cylinder and associated sleeve valve adapted to move with combined axial reciprocation and oscillation, said cylinder and sleeve having cooperating intake and exhaust ports, a piston, a crankshaft connected with the piston, means for imparting said movement to the sleeve valve, said intake and exhaust ports of the cylinder and sleeve valve each having a pair of port controlling edges respectively adapted for similar functions, and means for relatively shifting the cylinder and sleeve ports to selectively cause cooperation of said pairs of cylinder and sleeve valve port controlling edges.

16. In an internal combustion engine the combination of a cylinder having a piston and crankshaft, sleeve valve means for said cylinder, means operating said sleeve valve means, said cylinder and sleeve valve having cooperating intake and exhaust ports, and means for relatively shifting the cylinder and sleeve ports to cause the engine to reverse its operation.

17. In an engine the combination of a cylinder having a piston and crankshaft associated therewith, valving means for the cylinder including a sleeve valve, a single layshaft driven from the crankshaft and adapted to operate said sleeve valve, and means for shifting said layshaft to cause reversal of the engine.

18. In an engine, a cylinder, sleeve valve means associated with said cylinder, means for shifting said sleeve valve operating means longitudinally of the engine to cause engine reversal.

19. In an engine having a cylinder, a sleeve valve operably associated with said cylinder, a valveshaft operably connected to a single point of said sleeve valve to impart driving movement thereto, and means for reversing the direction of motion of the engine by selectively shifting said driving point to either side of a plane containing the sleeve valve radius perpendicular to the valveshaft axis.

20. In an engine having a cylinder, a sleeve valve operably associated with said cylinder, a valveshaft operably connected to a single point of said sleeve valve to impart driving movement thereto, and means for reversing the direction of motion of the engine by selectively shifting said driving point for substantially an equal amount to either side of a plane containing the sleeve valve radius perpendicular to the valveshaft axis.

21. In an engine having a cylinder formed with an intake port, a sleeve valve associated with said cylinder and adapted to move in a combined reciprocating and oscillating path, said sleeve valve having an intake port cooperating with said cylinder intake port, said sleeve intake port beginning its opening movement with said cylinder intake port while the sleeve is moving mainly with oscillation at the bottom of its stroke, said sleeve intake port at said intake beginning movement having a portion thereof extending axially below said cylinder intake port, said port portion passing over said cylinder intake port during the intake cycle, said ports having apices extending substantially axially of said sleeve.

22. In an engine having a cylinder formed with an intake port, a sleeve valve associated with said cylinder and adapted to move in a combined reciprocating and oscillating path, said sleeve valve having an intake port cooperating with said cylinder intake port, said sleeve intake port beginning its opening movement with said cylinder intake port while the sleeve is moving mainly with oscillation at the bottom of its stroke, said sleeve intake port at said intake beginning movement having a portion thereof extending axially below and circumferentially to one side of said cylinder intake port during the intake cycle, said ports having apices extending substantially axially of said sleeve.

23. In an engine having a cylinder, a sleeve valve associated with said cylinder and having combined reciprocating and oscillating movement, said sleeve and cylinder having a pair of cooperating intake ports, said ports having substantially oppositely pointing apices, each of said ports having an edge opposite to its apex, said edge of one of said ports being lower axially of the sleeve than said apex of the other of said ports at the beginning of port intake opening.

24. In an engine, a cylinder having a port, sleeve valve means associated with said cylinder and having a port, means for operating said sleeve valve means to move said sleeve port relative to said cylinder port, and means for shifting said operating means whereby to shift said sleeve valve means relative to said cylinder and to cause a reverse engine operation.

25. In an engine having a cylinder, sleeve valve means, means for driving said sleeve valve means selectively from different points of initial movement whereby to shift said sleeve valve means relative to the cylinder, said cylinder and sleeve valve means having cooperating ports adapted to function for either of said sleeve valve driving movements.

26. In an engine having a cylinder, sleeve valve means, means for driving said sleeve valve means selectively from different points of initial movement whereby to shift said sleeve valve means relative to the cylinder, said cylinder and sleeve valve means having cooperating ports adapted to function for either of said sleeve valve driving movements, said cylinder having a port functionless for one of said driving movements but having valving function for another of said driving movements.

ANDRE J. MEYER.